(12) United States Patent
Kobata et al.

(10) Patent No.: US 10,214,286 B2
(45) Date of Patent: Feb. 26, 2019

(54) PROGRAMMABLE MULTI-GRAVITY TEST PLATFORM AND METHOD FOR USING SAME

(71) Applicant: The Boeing Company, Chicago, IL (US)

(72) Inventors: Stuart R. Kobata, Huntington Beach, CA (US); Martin Edward Lozano, Huntington Beach, CA (US); Henry Rodriguez, Jr., Diamond Bar, CA (US); Kevin Swenson, Huntington Beach, CA (US); Brian Vaniman, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 224 days.

(21) Appl. No.: 15/258,902

(22) Filed: Sep. 7, 2016

(65) Prior Publication Data
US 2018/0067501 A1    Mar. 8, 2018

(51) Int. Cl.
*B64C 39/02* (2006.01)
*G01M 99/00* (2011.01)
*G05D 1/10* (2006.01)
*B64F 5/60* (2017.01)

(52) U.S. Cl.
CPC ............... *B64C 39/024* (2013.01); *B64F 5/60* (2017.01); *G01M 99/004* (2013.01); *G05D 1/102* (2013.01); *B64C 2201/127* (2013.01); *B64C 2201/128* (2013.01)

(58) Field of Classification Search
CPC combination set(s) only.
See application file for complete search history.

(56) References Cited

FOREIGN PATENT DOCUMENTS

WO    WO-2016187758 A1 * 12/2016    ............. G01C 21/00

OTHER PUBLICATIONS

Schulz, M., "High-g quadrocopter training: exploring the limits", published on May 5, 2015. https://www.youtube.com/watch?v=iJPy1geXu4M.
"S15: Drone", Embedded Systems Learning Acadamy, pp. 1-10, accessed Jul. 6, 2016. http://www.socialledge.com/sjsu/index.php?title=S15:_Drone.
Hoffman, G. M., et al., "Quadrotor Helicopter Trajectory Tracking Control", American Institute of Aeronautics and Astronautics, pp. 1-14, 2008.

(Continued)

*Primary Examiner* — Anne M Antonucci
*Assistant Examiner* — Renee LaRose
(74) *Attorney, Agent, or Firm* — Gates & Cooper LLP

(57) ABSTRACT

A system and method for collecting test data from a unit under test (UUT) in a multi-gravity environment is disclosed. In one embodiment, the method comprises determining a desired accelerative load profile for the UUT, determining the commanded flight profile of a flight vehicle at least in part from the desired accelerative load profile and a predicted dynamic response of the flight vehicle having the UUT mounted thereto to the commanded flight profile, commanding the flight vehicle having the UUT mounted thereto to fly the determined flight profile, and collecting the test data using a data acquisition system communicatively coupled to the UUT.

20 Claims, 12 Drawing Sheets

(56) References Cited

OTHER PUBLICATIONS

Sensors, Accessed Jul. 6, 2016. http://www.mdpi.com/sensors/sensors-11-07502/article_deploy/html/images/sensors-11-07502f13.png.

Krishnakumar, R., et al., "Enhanced Hover Control of Quad Tilt Frame UAV under Windy Conditions", Int J Adv Robot Syst, 2015, 12:146.

Jan, S. S., et al., "Integrated Flight Path Planning System and Flight Control System for Unmanned Helicopters", Sensors 2011, 11(8), 7502-7529. http://www.mdpi.com/1424-8220/11/8/7502/htm.

* cited by examiner

PROGRAMMABLE MULTI-GRAVITY TEST PLATFORM AND METHOD FOR USING SAME

BACKGROUND

1. Field

The present disclosure relates to systems and methods for performing dynamic tests on test articles, and in particular to a system and method for inexpensively subjecting such test articles to multi-gravity environments.

2. Description of the Related Art

The testing of subsystems to assure they meet design and manufacture requirements is well known in the art. Such testing may include subjecting the unit under test (UUT) to one or more environmental conditions at the same time, and may be performed while testing the functionality of the UUT. For example, a UUT may be exposed to extreme heat and cold, then tested to assure that it still meets all functional requirements after such exposure, or the UUT may be tested to assure that the UUT meets all functional requirements while under such exposure to heat and cold. Still further, the UUT may be subjected to other environmental situations while being tested at such temperature extremes. For example, the UUT may be subjected to vibration as well as temperature and tested to assure it meets functional requirements while exposed to both environmental conditions.

Some environmental conditions are particularly difficult to simulate for test purposes. One such environmental condition is subjecting the subsystem to zero g (g representing the acceleration of gravity) or micro g loads. Such conditions are difficult to test for because it is difficult to subject the UUT to zero g conditions. In the past, zero g conditions could be achieved either in space or in specially configured airplanes that fly parabolic trajectories and provide a zero g or near zero g environment for short periods of time. Both testing in space and testing in zero g aircraft have particular disadvantages.

A first disadvantage is that both zero and micro (µ) g test methods are expensive, and while suitable for expensive science experiments, are not suitable for ordinary experiments or production testing.

A second disadvantage is that both zero and µ g test methods do not allow the desired accelerative load to be applied in conjunction with other environments. For example, such tests cannot be performed in extreme hot or cold, or under a particular vibration profile, because such environmental conditions may put the space vehicle or aircraft at risk.

A third disadvantage is that both zero and µ g test methods cannot be employed for subsystems that might catastrophically fail upon test. For example, a fuel subsystem can be tested in space or on an airplane to simulate zero or µ g fuel sloshing, but if such sloshing carries a risk of fire or other critical result, the spacecraft/aircraft may be put to unacceptable risk, particularly if humanly piloted.

What is needed is a system and method for performing environmental testing, in particular testing in zero or µ g environments without the foregoing disadvantages. Such a system and method is disclosed below.

SUMMARY

To address the requirements described above, this document discloses a system and method for collecting test data from a UUT. In one embodiment, the method comprises determining a desired accelerative load profile for the UUT, determining the commanded flight profile of a flight vehicle at least in part from the desired accelerative load profile and a predicted dynamic response of the flight vehicle having the UUT mounted thereto to the commanded flight profile, commanding the flight vehicle having the UUT mounted thereto to fly the determined flight profile, and collecting the test data using a data acquisition system communicatively coupled to the UUT. Another embodiment is evidenced by an apparatus having a processor and a communicatively coupled memory storing processor instructions for performing the foregoing operations. Still another embodiment is evidenced by a system for collecting test data from a unit under test (UUT) subjected to a flight profile. The system comprises a flight vehicle, comprising a UUT mount, a propulsion system, an inertial reference unit for measuring flight vehicle flight dynamics, a flight control system, communicatively coupled to the inertial reference unit and the propulsion system, for generating propulsion system commands from a commanded flight vehicle flight profile and the flight vehicle dynamics, wherein the commanded flight profile of a flight vehicle is determined at least in part from a desired accelerative load profile and a predicted dynamic response of the flight vehicle having the UUT mounted thereto to the commanded flight profile, a data acquisition system, communicatively coupled to the UUT, for collecting the test data while the UUT is subject to the flight profile and a processor, communicatively coupleable to the data acquisition system, for processing the collected UUT data.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Figure 1:
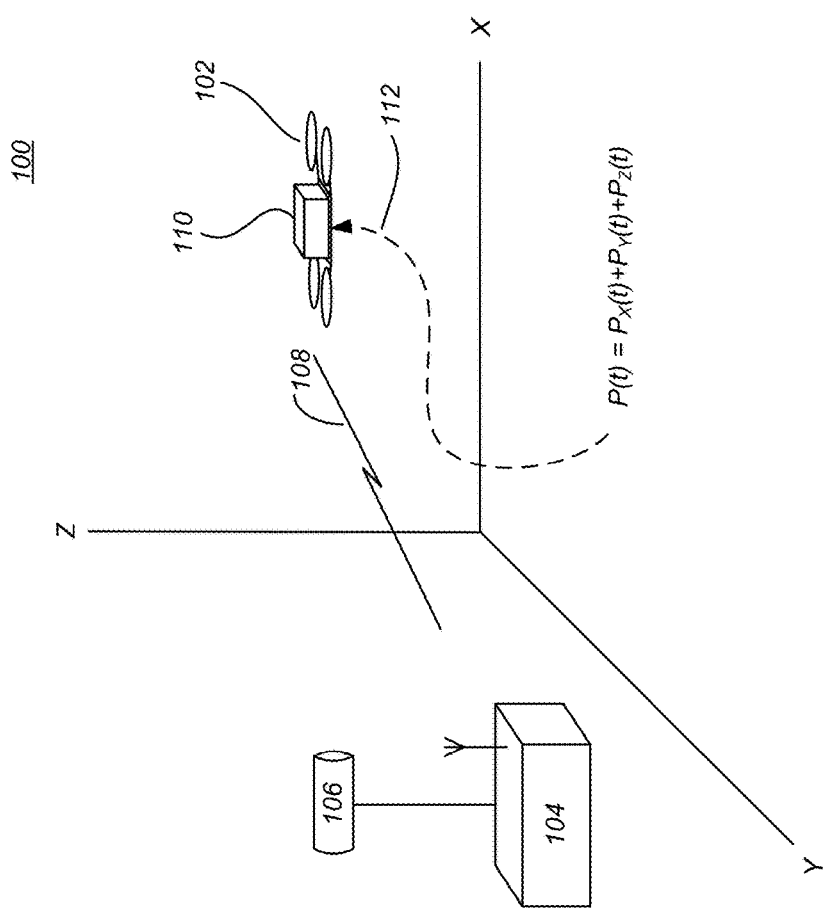
FIG. 1 is a diagram of an exemplary subsystem test facility.

FIG. 1 is a diagram of an exemplary subsystem test facility (STF) 100. The STF 100 includes flight vehicle (FV) 102 having a UUT 110 mounted thereto, a test controller 104, and optionally, a sensor package having one or more test sensors 106.

The UUT 110 is mounted to the FV 102, and thereafter, the FV 102 follows a flight path P(t) 112, subjecting the UUT 110 to accelerative (G) loads as desired. The FV 102 may fly the flight path within an environmental test chamber that allows the UUT 110 to be tested in particular environments. Such environments subject the UUT 110 to particular environmental conditions (for example, temperature or humidity) during flight testing. Furthermore, the UUT 110 may be mounted on a sub-platform that can subject the UUT 110 to vibration loads while mounted on the FV 102 following the flight path 112.

In one embodiment, the desired flight path 112 of the FV 102 is pre-programmed in the FV 102, and the FV 102 simply follows the pre-programmed flight path 112. In this embodiment, inertial sensors on-board the FV 102 measure FV 102 dynamics in flight, and a control system of the FV 102 use these monitored dynamics to control the FV 102 to follow the pre-programmed flight path. In one embodiment, such on-board inertial sensors include accelerometers that sense acceleration in three at least partially orthogonal directions and gyros that sense the rotational velocity of the FV 102 about three axes that are at least partially orthogonal.

The FVs on-board inertial sensors can also be used to measure the dynamics (e.g. acceleration and rotation) that the FV 102 (and hence the UUT 110) is subjected to as a function of time while following the flight path 112. Such data may simply be stored by the FV 102 until the end of the flight test, then retrieved from the FV 102, or transmitted to the test controller 104 during the flight test.

In one embodiment, one or more of the test sensors 106 are used to monitor the FV 102 flight dynamics (e.g. position, velocity, or acceleration) during the test. The flight dynamics measured by the test sensors 106 can be used to measure or estimate the position, velocity or acceleration that the FV 102 (and hence, the UUT 110) is subjected to during the flight, thus providing data that can augment or replace the dynamic data provided by the inertial sensors on the FV 102. The sensor package 106 sensors may be passive (e.g. merely sense energy emanating from the FV 102 or UUT 110) such as visual, IR, μv, or similar passive sensors, or may be active sensors (e.g. wherein the energy sensed is provided by an illuminator). Examples of active sensors include those relying on radar, lidar, or the like.

In another embodiment, the FV 102 is communicatively coupled to the controller 104, and the controller 104 provides flight path commands to the control system of the FV 102 via wireless link 108 in real time, and the FV 102 responding by following the commanded flight path. In this embodiment, in addition to using the on-board inertial sensors of the FV 102 to measure FV 102 flight dynamics, test sensor 106 measured flight dynamics can be provided to the controller 104, and be used to refine or further generate the flight path commands provided to the FV 102 (essentially using the test facility sensor package 106 to close another control loop around the FV 102 to provide for more precise control over the flight of the FV 102).

Other sensors 106 may be included in the sensor package 106 as well. For example, the sensor package may include temperature sensors or humidity sensors, so that the temperature or humidity of the air that the FV 102 flies through is accurately determined. Such temperature or humidity sensors may be part of a closed loop temperature and/or humidity control system that maintains the temperature and/or humidity of the test chamber to particular values as a function of time.

In a further embodiment, the test sensors 106 include imaging sensors that are used to obtain image data of the UUT 110 during flight. For example, if the UUT 110 is a system that includes vessels that store fluid, imaging sensors 106 can be used to record video or still images of the fluid sloshing in vessels in the fluid storage system as described further below.

Figure 2A:
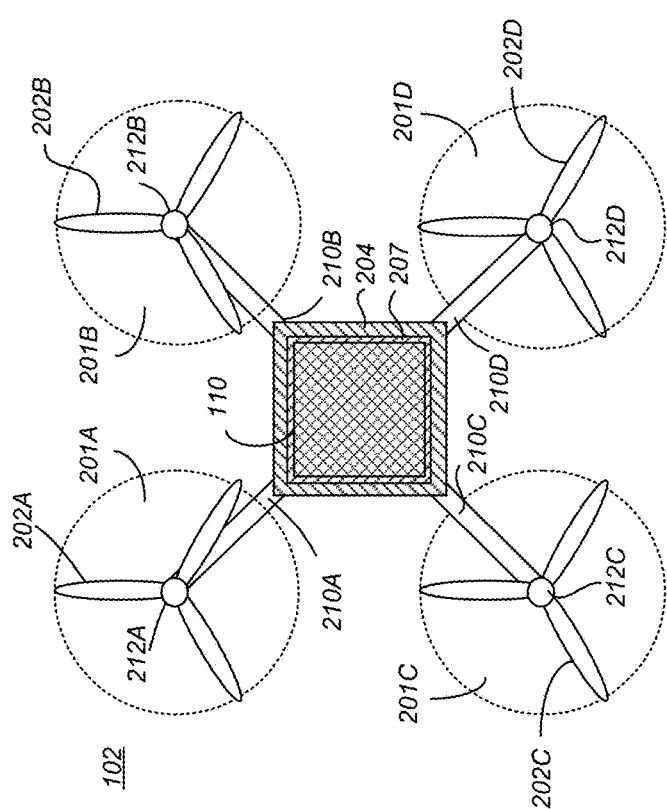
FIGS. 2A and 2B are diagrams depicting a top view and a side view one embodiment of the flight vehicle.
Figure 2B:
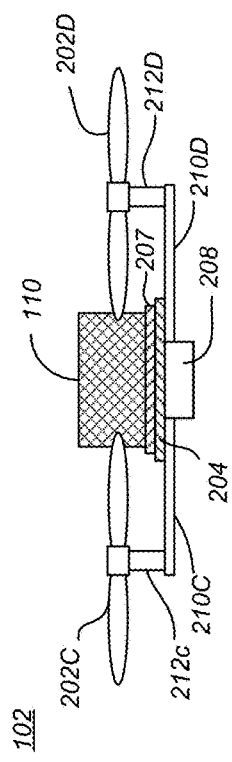

FIGS. 2A and 2B are diagrams depicting a top view and a side view of one embodiment of the FV 102, respectively. The FV 102 includes a plurality of propulsion devices 201A-201D (hereinafter alternatively referred to as propulsion device(s) 201). In the illustrated embodiment, the propulsion devices comprise a plurality of propellers 202A-202D (hereinafter, alternatively referred to as propeller(s) 202) each independently driven by a respective one of a plurality of motors 212A-212D (hereinafter, alternatively referred to as motor(s) 212). Motors 212 are typically electric motors, but internal combustion motors may be used as well. Further, other propulsive device technologies may be used. For example, if it is desired to subject the UUT 110 to particularly high g loads, more powerful propulsive devices 201 may be used to augment or replace the propeller driven propulsive devices illustrated in FIG. 2A. Such propulsive devices may include, for example, chemical propulsion devices, or magnetic propulsion devices.

The propulsion devices 201 are rigidly coupled to the FV body 204 via struts 210A-210D, and the UUT 110 is mounted to the FV body 204 via mount 207. The FV body 204 also includes a control module 208 that generates commands for each of the propulsion devices 201 to fly the FV 102 along the flight path 112. The control module 208 may also include a transceiver for transmitting data to and receiving data from the controller 104.

Although the illustrated embodiment of the FV 102 has a propulsion system that comprises four propulsion devices 201A-201D affixed to the FV body 204, other embodiments are also possible that use fewer or greater propulsion devices 201, so long as the propulsion devices provide the FV 102 the ability to move laterally in three-degrees of freedom (e.g. along the X, Y, and Z axes in FIG. 1), and to control the attitude of the FV 102.

In one embodiment, the FV 102 comprises a commercially available drone such as the DJI Matrice 100, available from the DJI corporation.

Figure 3:
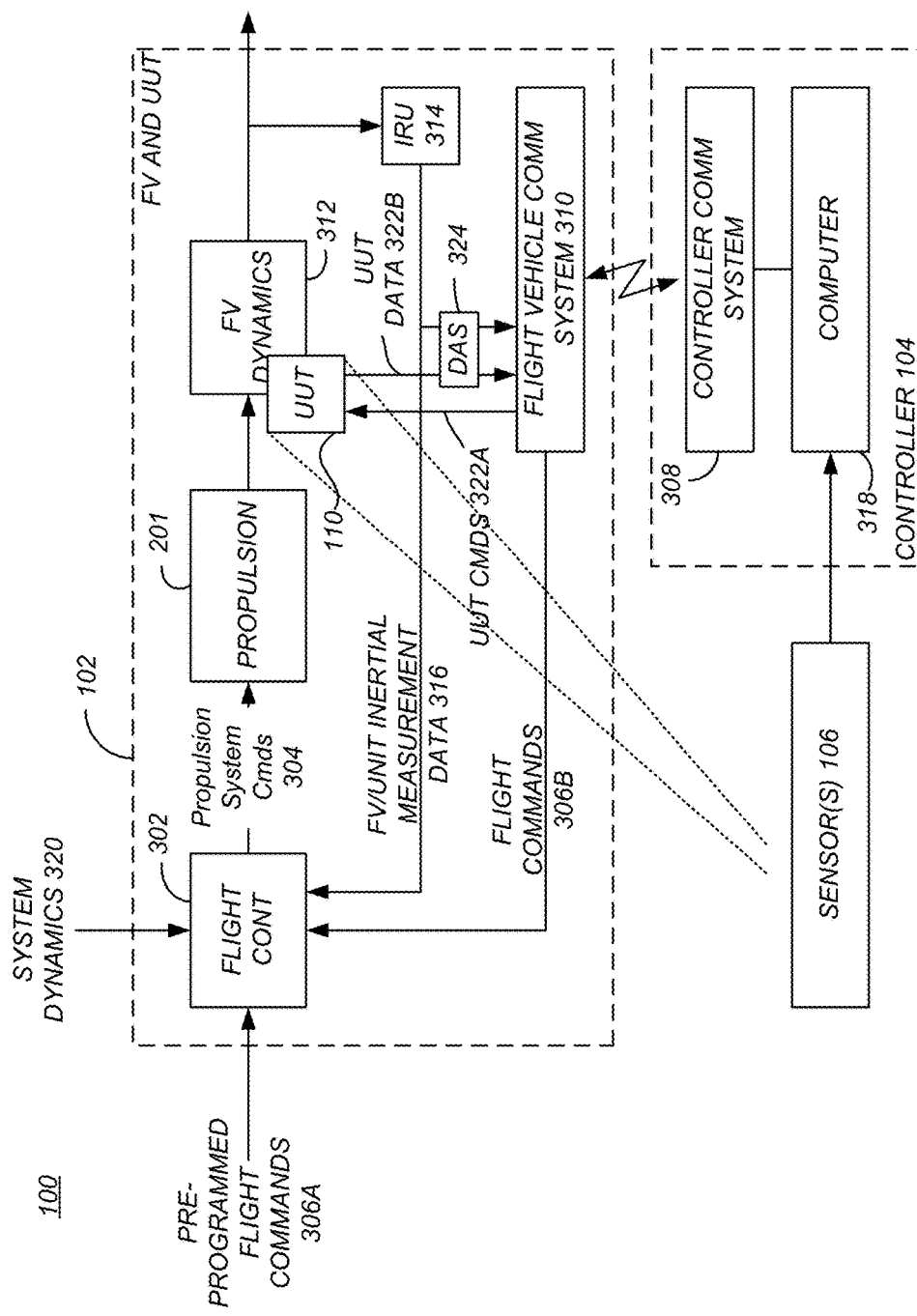
FIG. 3 is a diagram illustrating a functional block diagram of one embodiment of the subsystem test facility, including the flight vehicle.

FIG. 3 is a diagram illustrating a functional block diagram of one embodiment of the STF 100, including a more detailed diagram of the FV 102. In the illustrated embodiment, the FV 102 comprises a flight controller 302 that generates propulsion system commands 304 from pre-programmed FV flight commands 306A and/or flight commands 306B and FV 102 inertial measurement data 316. The inertial measurement data 316 includes measurements of the dynamics of the FV 102 in flight, and is provided by an inertial reference unit (IRU) 314 disposed on the FV 102.

Typically, the IRU 314 comprises three acceleration sensors (e.g. accelerometers) each of which measure the acceleration of the FV 102 in one of three at least partially orthogonal axes, and three rate sensors (e.g. gyros), each of which measure the rotation rate of the FV 102 about one of three at least partially orthogonal axes. The propulsion system 201 accepts the propulsion system commands 304 from the flight controller 302 and propels the FV 102 in accordance with these commands 304.

In the illustrated embodiment of FIGS. 2A and 2B, the FV 102 comprises four propulsion devices 201A-201D, and a command is provided to each device. Such propulsion commands 304 can command the FV 102 to maneuver in any lateral direction and rotate about any axis. FV dynamics block 312 represents the dynamic response of the FV 102 with the UUT 110 mounted thereon to the thrust provided by the propulsion system 201 in response to the propulsion system commands 304. The dynamic response of the FV 102 is measured by the IRU 314 in the form of inertial measurements of the acceleration and rotation rate of the FV 102, and this information is provided to the flight controller 302 so that errors between the commanded flight path of the FV 102 and the actual flight path of the FV 102 are driven to or near zero.

In one embodiment, the FV 102 also comprises a flight vehicle communication system (FVCS) 310. The FVCS 310 provides one-way or two-way communications between the FV 102 and the controller 104.

Communications to the FV 102 may include (in embodiments where required) flight commands 306B and/or UUT 110 commands 322A, thus allowing the UUT 110 to be functionally tested during flight. The flight commands 306B may take a number of different forms, as described further below. The UUT 110 commands may comprise commands for the UUT 110 to perform one or more operations or functions while being flight tested.

Communications from the FV 102 may include FV/UUT inertial measurement data 316 (e.g. from the IRU 314) and UUT 110 data (e.g. the response of the UUT 110 to the foregoing input commands or other data such as UUT 110 temperature or voltages). UUT data 322B and data from the IRU 314 (indicting the dynamic loads the UUT 110 is being subjected to in flight) as well as other test sensors (for example, temperature sensors on the UUT 110 or more precise inertial sensors to measure peak accelerations) are also communicatively coupled to a data acquisition system (DAS) 324, which collects the such data, and in embodiments where the data is wirelessly transmitted to the controller 104, provides the data to the FVCS. In other embodiments, the DAS 324 simply accepts and stores the data as it is acquired.

The FVCS 310 is communicatively coupled with the controller 104 via wireless link with the controller communication system (CCS) 308. A computer or similar processing device 318 is communicatively coupled to the CCS 308. The computer 318 generates the flight commands 306B and UUT 110 commands 322A where and when appropriate, and receives the FV/UUT inertial measurement data 316 and UUT data 322B. In addition, the computer 318 may receive sensor data from sensors 106.

Figure 4:
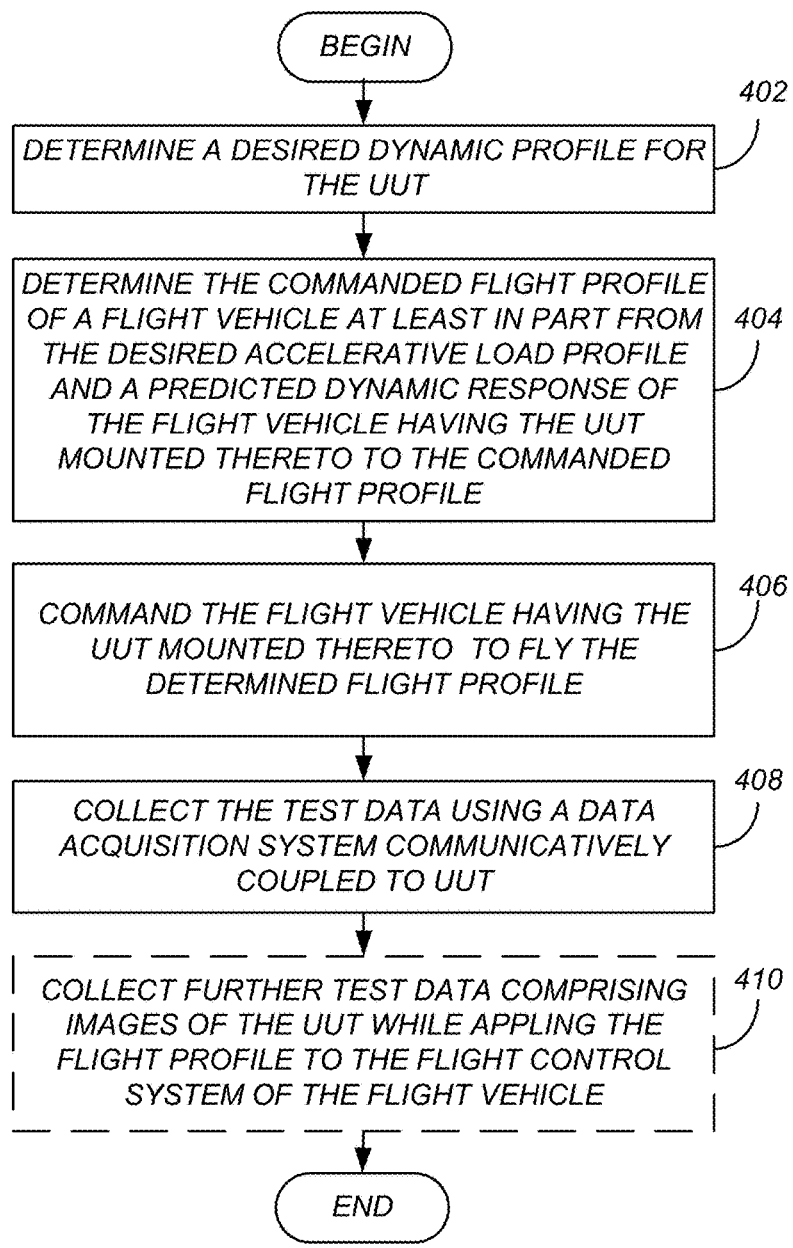
FIG. 4 is a diagram illustrating one exemplary process steps for collecting test data from a UUT.

FIG. 4 is a diagram illustrating exemplary process steps for collecting test data from a UUT 110. In block 402, a desired dynamic profile is determined for the UUT 110. In one embodiment, the desired dynamic profile is an accelerative profile.

Figure 5:
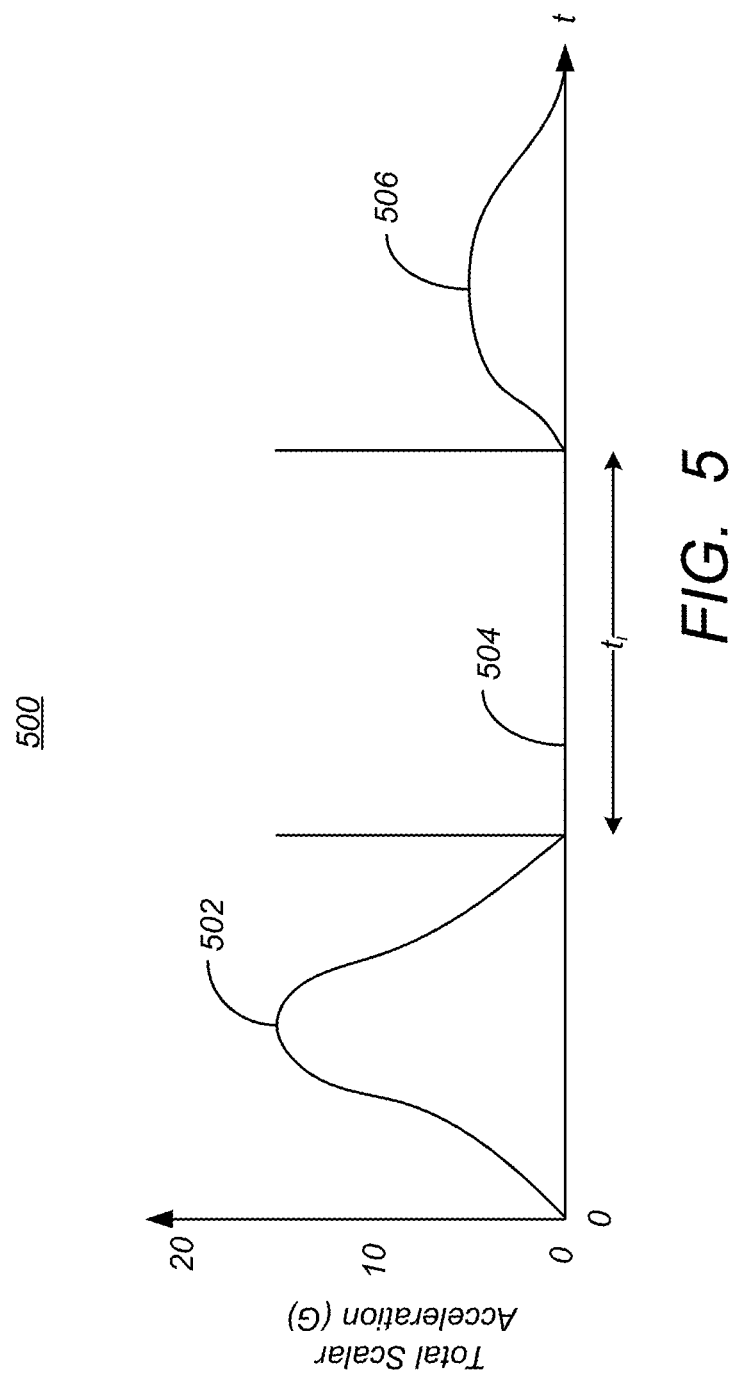
FIG. 5 is a diagram depicting an exemplary determined desired dynamic profile for the UUT.

FIG. 5 is a diagram depicting an exemplary determined desired dynamic profile for the UUT 110. In this embodiment, the desired accelerative profile is described by the total scalar acceleration (e.g. vector sum of the acceleration in three orthogonal directions) that the UUT 110 is to be subjected to. The accelerative profile includes a first accelerative profile portion 502 having a peak acceleration of 15 g, and a second accelerative profile portion 504 having an acceleration of 0 g for time period $t_i$, and a third accelerative profile portion 506 having a peak acceleration of about 5 g.

To obtain the desired acceleration of 0 g for a second accelerative profile portion 504 for time period $t_i$, the FV 102 must be commanded to descend at the rate of gravity (9.8 m/s$^2$). Neglecting wind resistance, this desired accelerative profile would amount to a free fall, but when air resistance is considered, the FV 102 must be commanded to descend to overcome such wind resistance, as discussed further below.

Figure 6:
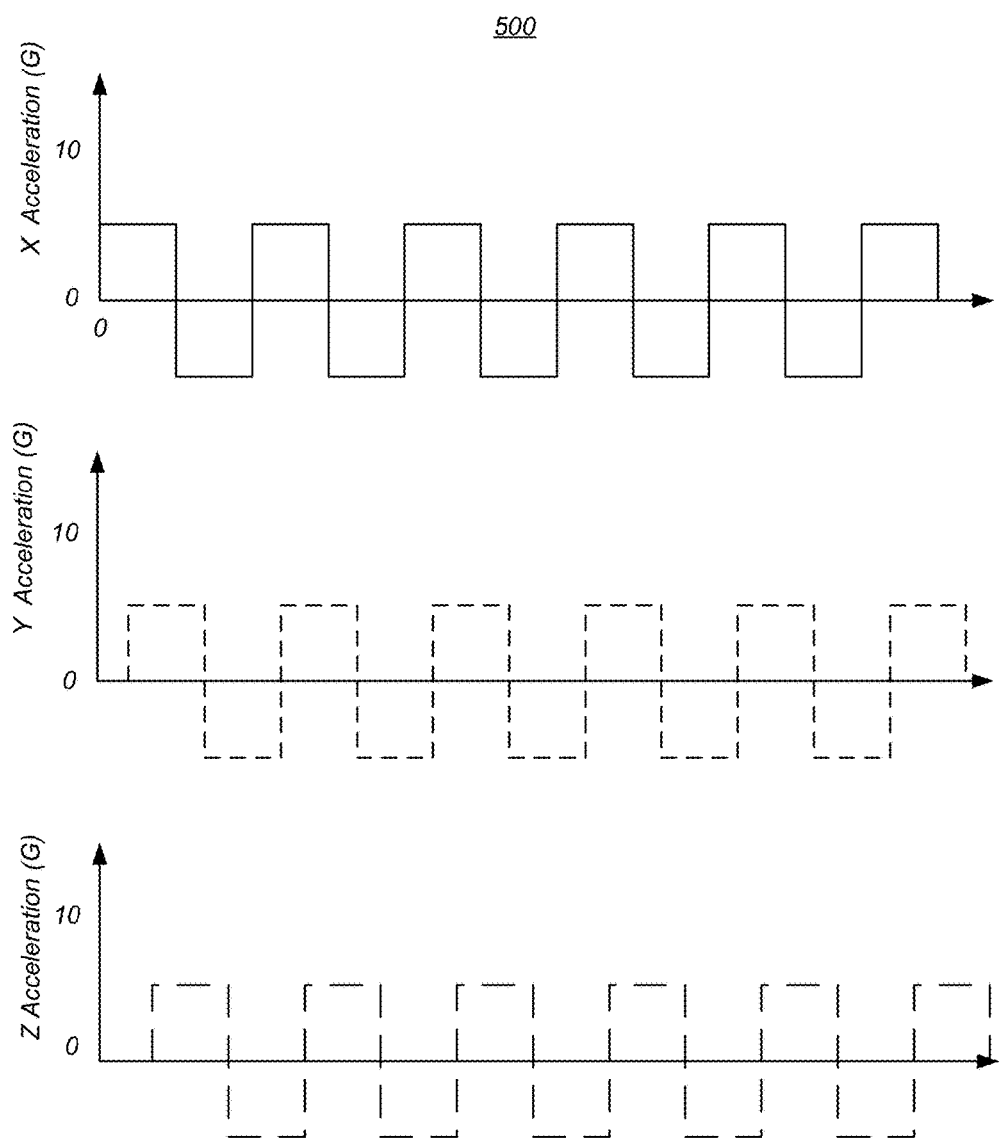
FIG. 6 is a diagram depicting another exemplary determined desired dynamic profile for the UUT.

Depending on the physical dimensions of the flight path of the FV 102, the zero or near zero gravity condition shown in FIG. 5 may be maintained for extended periods of time FIG. 6 is a diagram depicting another exemplary determined desired dynamic profile for the UUT 110. In this embodiment, the UUT 110 is to be exposed to acceleration in the x, y, and z axes in a square wave pattern with an amplitude of 4 g. This accelerative profile subjects the UUT 110 to accelerations in independent directions, and may illustrate the response of the UUT 110 to cross coupling between the x, y and t axes.

Figure 7:
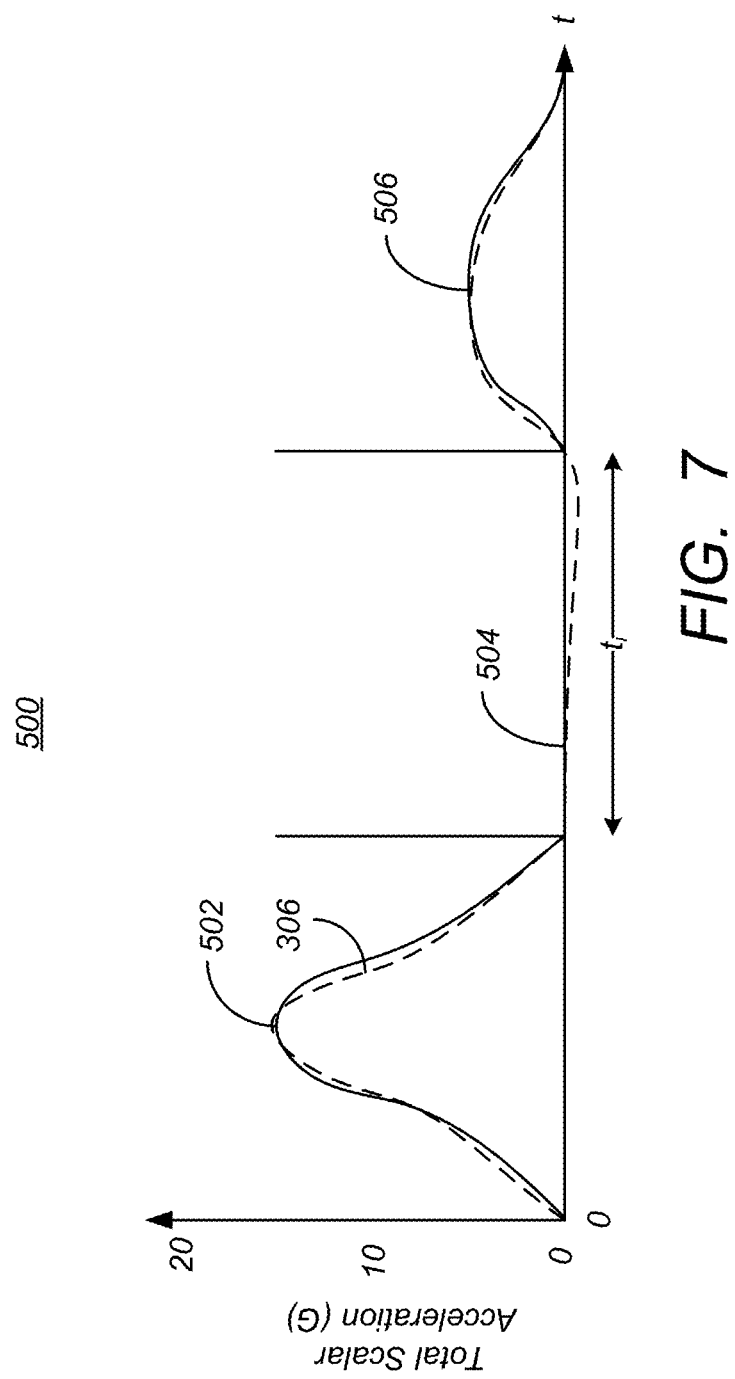
FIG. 7 is a diagram of an exemplary commanded flight profile for the flight vehicle from the desired flight profile.

Returning to FIG. 4, a commanded flight profile 306 for the FV 102 is determined, as shown in block 404. This commanded flight profile 306 is determined at least in part from the desired dynamic profile 500 (in the example, an accelerative load profile) and a predicted dynamic response of the FV 102 having the UUT 110 mounted thereto to the commanded flight profile 306. For example, returning to the exemplary desired accelerative profile 500 of FIG. 5, block 404 determines a commanded flight profile 306 for the FV 102 that will result in the illustrated accelerative profile 500. This must account for the flight dynamics of the combined FV 102 and UUT 110 and the limitations of the flight control system 302 and propulsion system 201 to respond to the commanded flight profile by flying the flight profile. FIG. 7 is a diagram of an exemplary commanded flight profile 306 for the FV from the desired flight profile 500. Note that the commanded profile 306 slightly differs from the desired accelerative profile 500, in an amount required so that the actual flight profile is as close as possible to the desired profile 500, taking into account the FV dynamics 312 (e.g. inertia), the propulsion system 201, the flight control system 302 and the IRU 314.

The FV 102 will be incapable of exactly providing some desired dynamic profiles for the UUT 110. For example, the desired dynamic profile illustrated in FIG. 6, cannot be provided because the FV 102 will be incapable of providing the instantaneous or near instantaneous changes in acceleration in each axes. In such cases, the desired dynamic profile may simply be provided to the FV 102 as the commanded flight profile.

Figure 8:
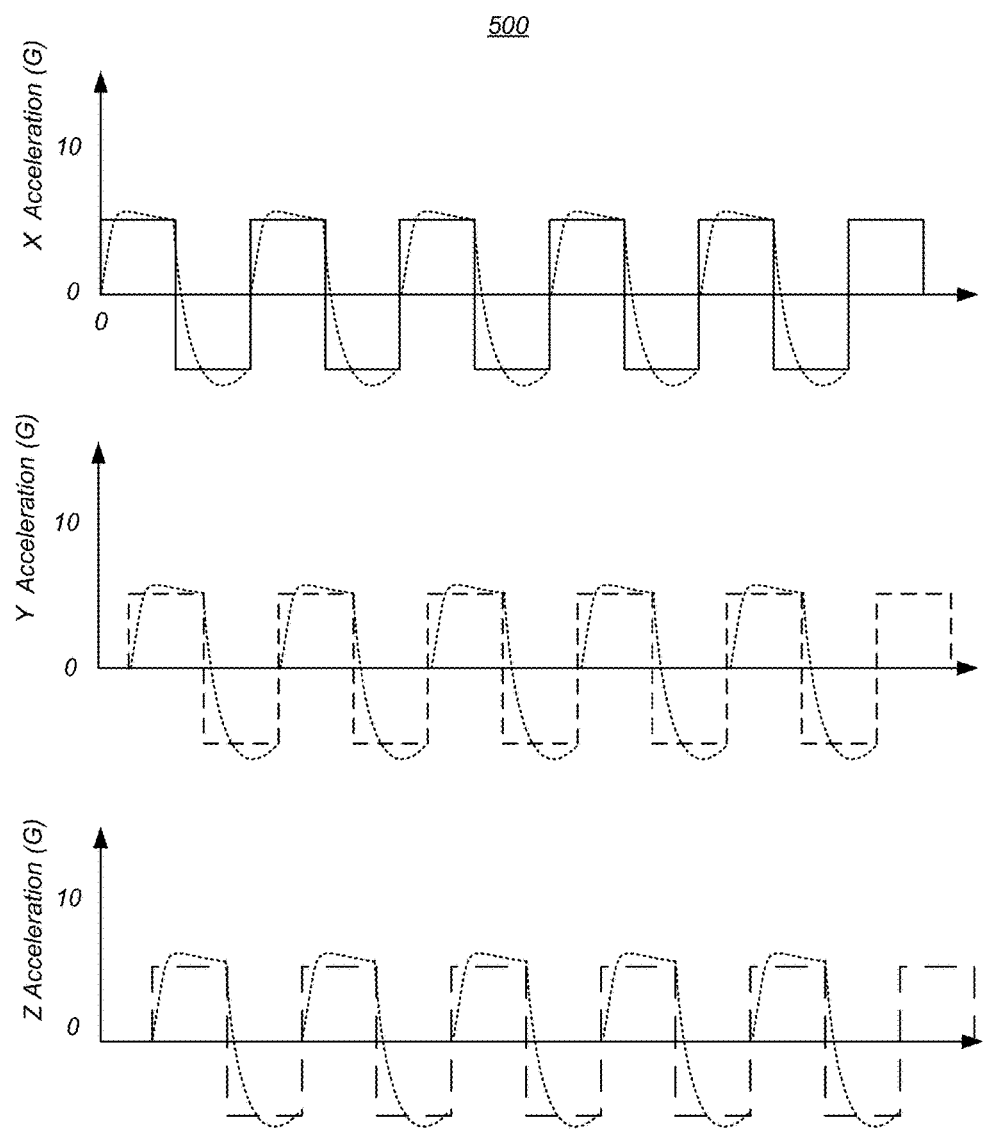
FIG. 8 is a diagram illustrating a typical flight vehicle response to the commanded flight profile in a situation where the commanded flight profile is the same as the desired commanded profile.

FIG. 8 is a diagram illustrating a typical FV 102 response to the commanded flight profile in a situation where the commanded flight profile is the same as the desired commanded profile. While the desired (and unachievable) square wave accelerations cannot be achieved, the FV 102 can subject the UUT 110 to accelerations that approximate the desired accelerations.

Figure 9:
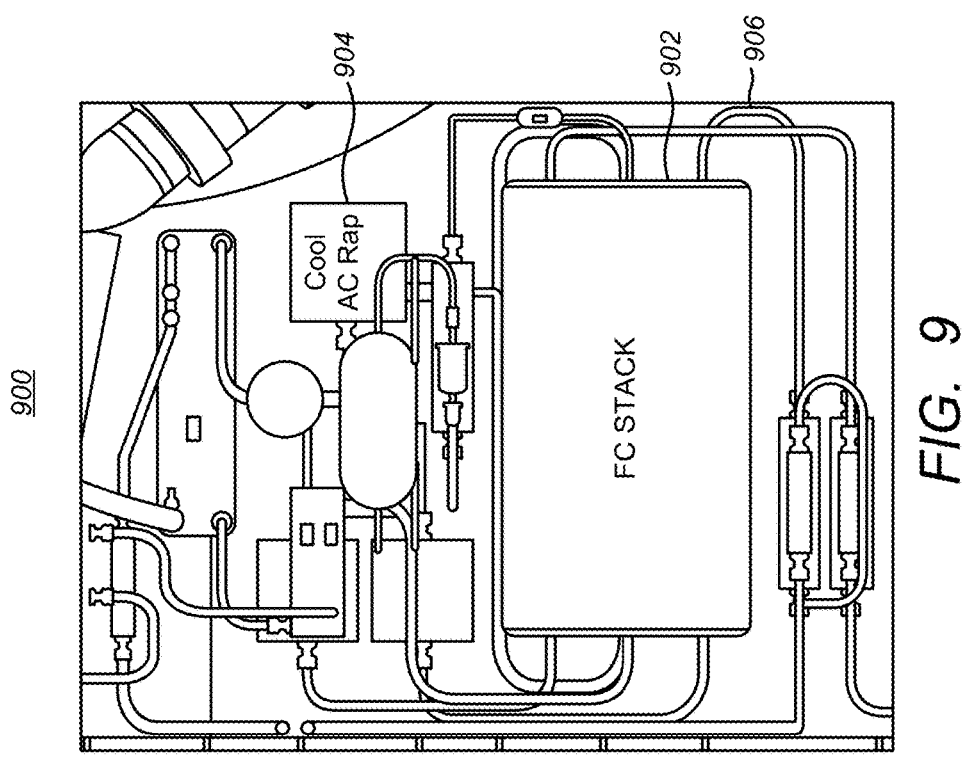
FIG. 9 is a diagram presenting an illustrative example of a fluid storage and transfer system.

One particularly useful application for the STF 100 is for purposes of testing UUTs 110 that include fluid storage and transfer systems. FIG. 9 is a diagram presenting an illustrative example of a fluid storage and transfer system 900. In the illustrated embodiment, the fluid storage and transfer system 900 includes a storage vessel 902, a pump 904 and a plurality of conduit 906, at least some of which provide fluid connection between the storage vessel 902 and the pump 904. When the UUT 110 is undergoing flight testing on the FV 102, liquids within the storage vessel 902 and elsewhere in the fluid storage and transfer system 900 can "slosh," thus changing the center of mass of the system 900 and inducing secondary motion. As described further below the STF 100 is particularly well suited for testing the UUT 110 to observe and test for such effects.

Importantly, the FV 102 will typically respond to such sloshing within the UUT 110 differently than the operational system that the UUT 110 is ultimately used with. For example, the FV 102 may be of significantly less mass than the operational system, and liquid sloshing may induce motions in the FV 102 to an extent that would not be seen in the operational system. Conversely, the FV 102 may be of significantly greater mass, and liquid sloshing not be induced to the FV 102 to the extent that they would be in the operational system. So that the FV 102 may respond more like the operational system to such secondary (and difficult to predict) effects, the flight controller 302 of the FV 102 may be programmed with system dynamics 320 so that the FV 102 simulates, to the extent possible, the response of the operational system to UUT 110 induced motion while under flight test. Hence, in this embodiment, the flight control system is programmable to simulate a plurality of flight dynamics. Further, the FV 102 may comprise propulsion devices 201 that may be replaced with other propulsion devices 201 of greater or less thrust capability (with appropriate changes to the flight controller 302 programming) so that the FV 102 responds to such motions as closely as possible to how the operational system would respond.

UUT 110 may comprise items that are cryogenically cooled, for example, an IR sensor or similar system. Such systems cannot typically tested while undergoing zero or low g environment for any significant length of time, because such cryogenically cooled UUTs 110 pose a safety hazard if used in aircraft flying parabolic trajectories. Since the FV 102 is not piloted by human beings and is reasonably inexpensive, the testing of such cryogenically cooled UUTs 110 may be performed.

Returning to FIG. 4, block 406 commands the FV 102 having the UUT 110 mounted thereto to fly the determined flight test profile. As described above, this may be accomplished by providing pre-programmed flight commands 306A to the flight controller 302 of the FV 102. Flight commands 306B may be provided remotely via a wireless link using the FVCS 310. Further, if desired, flight commands 306A in the form of a pre-programmed flight profile may be provided to the flight controller 302 of the FV, and during flight, data describing the actual dynamics of the FV 102 (using the IRU 314 and/or the sensors 106) may be used to provide additional flight commands 306B to improve control over the FV 102 flight.

The flight commands 306 may be described in a number of ways. In one embodiment, the flight commands comprise acceleration commands in one or more orthogonal directions that are provided to the flight controller. In other embodiments, the flight commands comprise the commanded position of the FV 102 on one or more orthogonal directions over time, such as P(t) as illustrated in FIG. 1.

In one embodiment, the FV 102 flies the determined flight profile within environmental test chamber of the STF 100. This permits the UUT 110 to undergo flight testing in different environments. For example, liquid sloshing characteristics may change depending upon the temperature of the environment that the UUT 110 is operating in. Use of a small FV 102 in an environmental test chamber allows the effect of liquid sloshing to be determined at such temperatures. This kind of testing would be difficult or impossible using aircraft flying parabolic trajectories and the like, as such aircraft cannot typically include an environmental test chamber.

Returning to FIG. 4, block 408 collects test data using the data acquisition system 324 communicatively coupled to the UUT 110. Such data may include the UUT 110 data 322B generated response to the UUT commands 322A during the flight test, as well as data from the IRU 314 describing the inertial acceleration, rotation and/or position of the UUT 110 over time.

Optionally, the test data may be augmented by collecting further test data, as shown in block 410. In this embodiment, the test data is augmented using information from sensors 106. Sensors 106 may comprise imaging sensors. These imaging sensors are used to collect images (stills and/or video) of the UUT 110 while the FV 102 with the UUT 110 mounted thereto is commanded to fly the determined flight profile. For example, imaging sensors may be used to observe liquid sloshing in fluid storage and transfer system 900 of the UUTs 110 such as the UUT 110 illustrated in FIG. 9 while the FV 102 is flying the determined flight profile. The dynamics of the fluids in the fluid transfer system 900 may then be simulated using the actual flight dynamics provided by the IRU 314 and/or sensors 106 and compared to images of the dynamics of the fluid storage and transfer system 900.

Although the sensors 106 are illustrated as being disposed separate from the FV 102, the sensors 106 may also be integrated with the FV 102, with the sensitive axes of the sensors 106 directed at the UUT 110. This allows imaging data to be more easily collected even when the FV 102 flies substantially long distances, as may be required in situations where a zero or near zero g environment is desired over a significant period of time. For example, the displacement of an object undergoing 1 g of acceleration can be approximated (in the absence of wind resistance) according to the well known Newtonian formula of $S=\frac{1}{2} at^2$, where S is the distance of the particle undergoing constant acceleration a for a time t. If it is desired to subject the UUT 110 to zero gs of acceleration for only one second, the FV 102 will typically drop about 9.8 meters or 32.2 feet. However, if longer periods of zero g environments are desired, the FV 102 must drop significantly longer distances. For example if 5 seconds of a zero g environment are desired, the FV 102 must drop about 122.5 meters. Placing sensors 106 on the FV 102 permits imaging of the UUT 110 without the need for special cameras with zooming and tracking capability.

Further, sensors 106 may provide the position of the FV 102 during the flight test, and this information may be used to determine the dynamic response of the FV 102 in terms of the position, attitude, or acceleration of the FV 102 (and hence, the position, attitude, or acceleration of the UUT 110 over time during the flight test, and can be used to augment or replace at least some of the inertial measurement information provided by the IRU 314. This can be implemented by providing the sensor 106 measurements to the controller 104 where they are processed to generate inertial data, and forwarding that inertial data to the flight control system 302 via the FVCS 310. The FV 102 may then be commanded according to the determined flight profile and the dynamic response of the FV 102 as determine from the images collected by sensors 106 as well as IRU 314 data.

Figure 10:
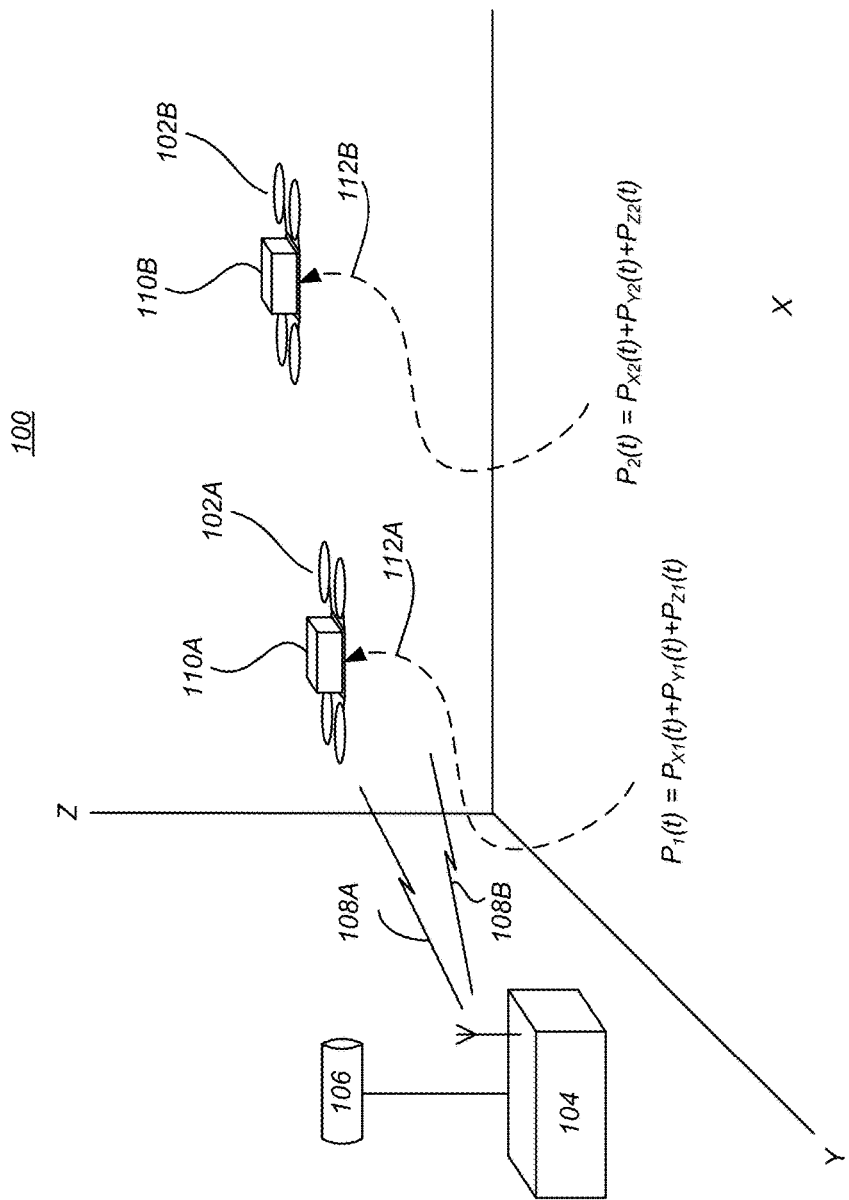
FIG. 10 is diagram of another embodiment of the subsystem test facility.

FIG. 10 is diagram of another embodiment of the STF 100. In this embodiment, the STF 100 comprises two FVs 102A, 102B, each having a respective one of two UUTs 110A, 110B mounted thereto. In embodiments in which the test controller 104 remotely commands the flight profile of the FV 102, the test controller 104 is configured to control both FVs 102A and 102B to follow flight paths $P_1(t)$ and $P_2(t)$, respectively. Further, sensors 106 may sense both FV 102A and 102B, or different sensors 106 may be dedicated to each FV 102A, 102B. This configuration permits two UUTs 110 to be tested at the same time, thus permitting each FV 102 to perform part of the test. For example, the UUT 110 may comprise a coupler having a male UUT 110A and a female UUT 110B. Mounting the male UUT 110A to the first FV 102A and the female UUT 110B to the second FV 102B permits the interplay between the UUTs 110A, 110B before, during, and after the coupling process to be examined, even in zero or near-zero g environments and when subjected to particular environmental conditions. In another example, a first UUT 110A may comprise a first sensor (for example, a cryogenic sensor), and the second UUT 110B may comprise a second sensor or a source of energy to be sensed by the first sensor. This would permit, for example, a test of cryogenic sensor being used in a zero or near zero g environment as it tracks a moving target.

Figure 11:
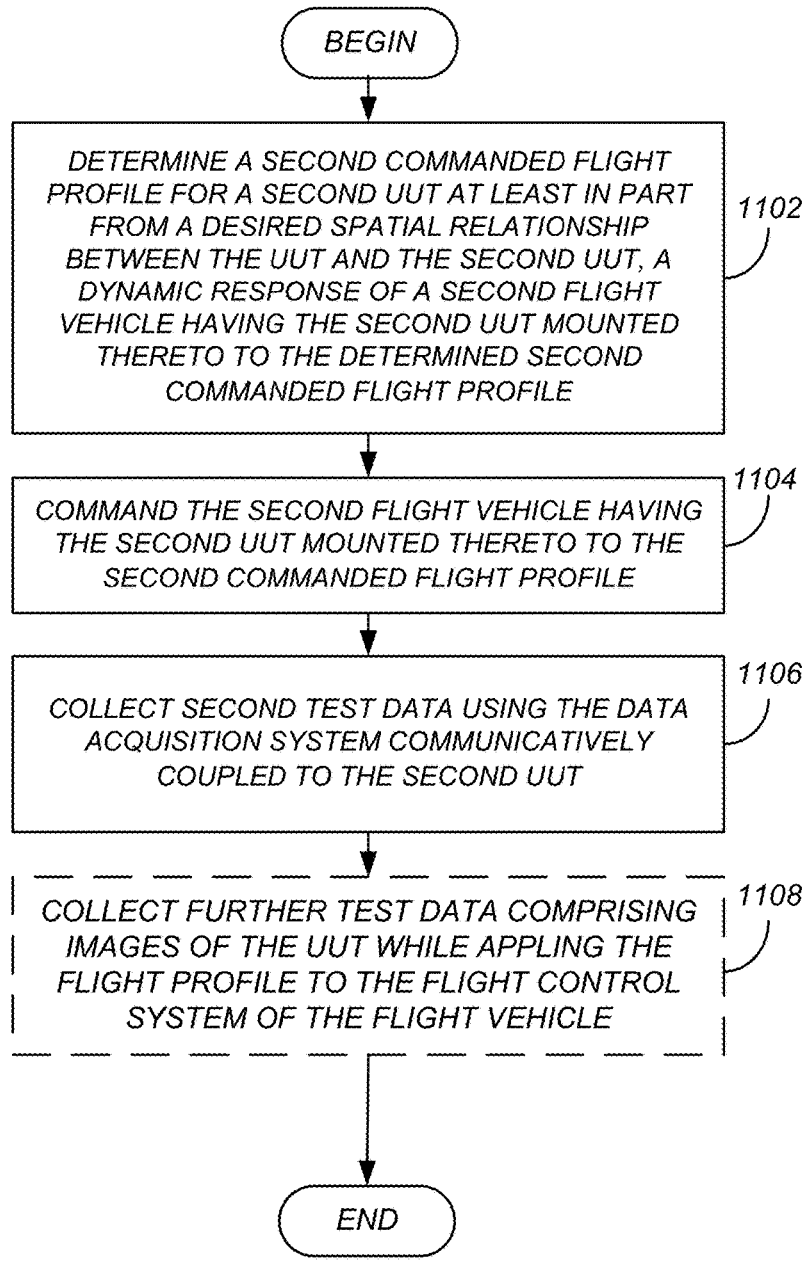
FIG. 11 is a diagram illustrating exemplary operations that can be used to collect test data using a subsystem test facility having a plurality of flight vehicles.

FIG. 11 is a diagram illustrating exemplary operations that can be used to collect test data using an STF 100 having two FVs 102A, 102B, each having a respective one of two UUTs 110A, 110B mounted thereto. In addition to the operations illustrated in FIG. 4 and discussed in the text appurtenant thereto, block 1102 determines a second commanded flight profile for the second FV 102B having the second UUT 110B mounted thereto. In one embodiment, this is determined at least in part from a desired spatial relationship between the first UUT 110A and the second UUT 110B over time, and the dynamic response of the second FV 102B having the second UUT 110B mounted thereto to the commanded flight profile. In block 1104, the second FV 102B is commanded according to the second commanded flight profile developed above. In block 1106, second test data is collected. In embodiments where the second UUT 110B is not simply a target or emitter, this may include using the data acquisition system of the second FV 102B. As before, further test data can be collected from images of the second FV 102B or UUT 110B during flight. Details of the operations of blocks 1102-1106 are analogous to those described above in the single FV 102/UUT 110 case.

Hardware Environment

Figure 12:
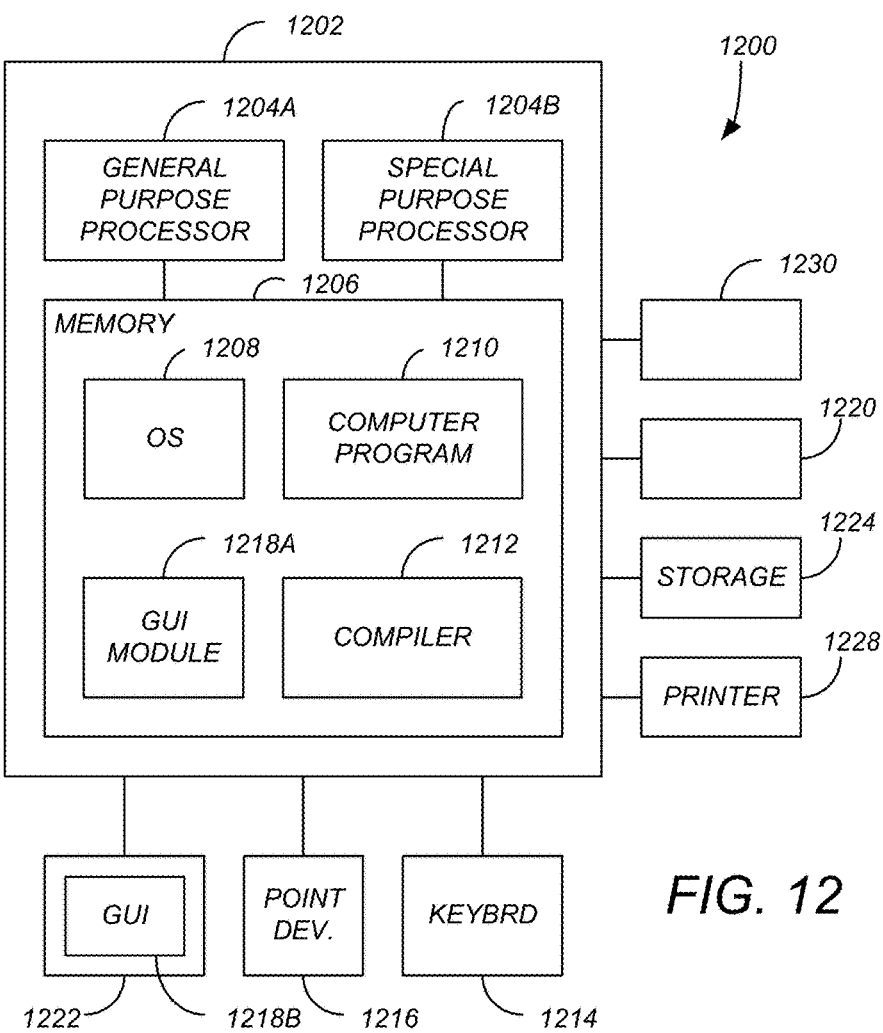
FIG. 12 illustrates an exemplary computer system that could be used to implement processing elements of the disclosure.

FIG. 12 illustrates an exemplary computer system 1200 that could be used to implement processing elements of the above disclosure, including the controller 104 (including the CCS 308 and the computer 318), the FVCS 310, the flight control system 302. The computer system 1200 may be used to generate and command flight profiles as well as to perform simulations and compare simulated results to test results.

The computer 1202 comprises a processor 1204 and a memory, such as random access memory (RAM) 1206. The computer 1202 is operatively coupled to a display 1222, which presents images such as windows to the user on a graphical user interface 1218B. The computer 1202 may be coupled to other devices, such as a keyboard 1214, a mouse device 1216, a printer, etc. Of course, those skilled in the art will recognize that any combination of the above components, or any number of different components, peripherals, and other devices, may be used with the computer 1202.

Generally, the computer 1202 operates under control of an operating system 1208 stored in the memory 1206, and interfaces with the user to accept inputs and commands and to present results through a graphical user interface (GUI) module 1218A. Although the GUI module 1218B is depicted as a separate module, the instructions performing the GUI functions can be resident or distributed in the operating system 1208, the computer program 1210, or implemented with special purpose memory and processors. The computer 1202 also implements a compiler 1212 which allows an application program 1210 written in a programming language such as COBOL, C++, FORTRAN, or other language to be translated into processor 1204 readable code. After completion, the application 1210 accesses and manipulates data stored in the memory 1206 of the computer 1202 using the relationships and logic that was generated using the compiler 1212. The computer 1202 also optionally comprises an external communication device such as a modem, satellite link, Ethernet card, or other device for communicating with other computers.

In one embodiment, instructions implementing the operating system 1208, the computer program 1210, and the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of instructions which, when read and executed by the computer 1202, causes the computer 1202 to perform the operations herein described. Computer program 1210 and/or operating instructions may also be tangibly embodied in memory 1206 and/or data communications devices 1230, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of collecting test data from a unit under test (UUT), comprising:
   determining a desired accelerative load profile for the UUT;
   determining a commanded flight profile of a flight vehicle at least in part from the desired accelerative load profile and a predicted dynamic response of the flight vehicle having the UUT mounted thereto to the commanded flight profile;
   commanding the flight vehicle having the UUT mounted thereto to fly the determined commanded flight profile; and
   collecting the test data using a data acquisition system communicatively coupled to the UUT.

2. The method of claim 1, wherein the desired accelerative load is substantially zero g sustained for a time period exceeding 1 second.

3. The method of claim 1, further comprising:
   collecting images of the UUT while commanding the flight vehicle having the UUT mounted thereto to fly the determined commanded flight profile.

4. The method of claim 3, further comprising:
   determining an accelerative load applied to the UUT at least in part from the collected images.

5. The method of claim 3, wherein:
   the UUT comprises a fluid storage and transfer system having vessels storing fluids therein; and
   the images of the UUT include images of dynamics of the fluid in the fluid storage and transfer system.

6. The method of claim 5, further comprising:
   simulating the dynamics of the fluid in the fluid storage and transfer system;
   comparing the simulated dynamics of the fluid in the fluid storage and transfer system with the images of the dynamics of the fluid storage and transfer system.

7. The method of claim 3, wherein commanding the flight vehicle having the UUT mounted thereto to fly the determined commanded flight profile comprises:
   determining a dynamic response of the flight vehicle at least in part from the collected images;
   commanding the flight vehicle having the UUT mounted thereto according to the determined commanded flight profile and the dynamic response of the flight vehicle determined at least in part from the collected images.

8. The method of claim 2, wherein commanding the flight vehicle having the UUT mounted thereto to fly the determined commanded flight profile is performed in an environmental test chamber at an environmental test temperature.

9. The method of claim 1, further comprising:
   determining a second commanded flight profile for a second UUT at least in part from a desired spatial relationship between the UUT and the second UUT, a dynamic response of a second flight vehicle having the second UUT mounted thereto to the determined second commanded flight profile;
   commanding the second flight vehicle having the second UUT mounted thereto to the second commanded flight profile; and
   collecting second test data using the data acquisition system communicatively coupled to the second UUT.

10. A system for collecting test data from a unit under test (UUT) subjected to a flight profile, comprising:
    a flight vehicle, comprising:
       a UUT mount;
       a propulsion system;
       an inertial reference unit, for measuring flight vehicle flight dynamics;
       a flight control system, communicatively coupled to the inertial reference unit and the propulsion system, for generating propulsion system commands from a commanded flight vehicle flight profile and the flight vehicle dynamics, wherein the commanded flight profile of a flight vehicle is determined at least in part from a desired accelerative load profile and a predicted dynamic response of the flight vehicle having the UUT mounted thereto to the commanded flight flight profile;
    a data acquisition system, communicatively coupled to the UUT, for collecting the test data while the UUT is subject to the flight profile; and
    a processor, communicatively coupleable to the data acquisition system, for processing the collected UUT data.

11. The system of claim 10, wherein the flight control system is programmable to simulate a plurality of flight dynamics.

12. The system of claim 10, wherein the commanded flight profile is determined at least in part from a desired accelerative profile.

13. The system of claim 12, wherein the desired accelerative profile includes zero g sustained for a time period exceeding 1 second.

14. The system of claim 10, further comprising:
    an imager for collecting further test data comprising images of the UUT while flying the commanded flight profile.

15. The system of claim 14, wherein:
    the UUT further comprises a fluid storage and transfer system; and
    the collected images of the UUT include images of dynamics of the fluid in the fluid storage and transfer system.

16. The system of claim 14, further comprising:
    the processor further determines an accelerative load applied to the UUT at least in part from the collected images of the UUT while commanding the flight vehicle having the UUT mounted thereto to fly the determined commanded flight profile.

17. The system of claim 10, further comprising an environmental test chamber, enclosing the flight vehicle in a test environment when the flight vehicle flies the determined commanded flight profile.

18. An apparatus for collecting test data from a unit under test (UUT) subjected to flight profile, comprising:
    a processor;
    a memory, communicatively coupled to the processor, the memory storing instructions comprising instructions for:
       determine a desired accelerative load profile for the UUT;
       determine a commanded flight profile of a flight vehicle at least in part from the desired accelerative load profile and a predicted dynamic response of the flight vehicle having the UUT mounted thereto to the commanded flight profile;
       command the flight vehicle having the UUT mounted thereto to fly the determined flight profile; and
       collect the test data using a data acquisition system communicatively coupled to UUT.

19. The apparatus of claim 18, wherein the instructions further comprise collecting images of the UUT while commanding the flight vehicle having the UUT mounted thereto to fly the determined commanded flight profile.

20. The apparatus of claim 18, wherein:
the UUT comprises a fluid storage and transfer system having vessels storing fluids therein; and
the images of the UUT include images of dynamics of the fluid in the fluid storage and transfer system.

* * * * *